(12) United States Patent
Goto et al.

(10) Patent No.: US 12,316,418 B2
(45) Date of Patent: May 27, 2025

(54) TRANSCEIVER, WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Daisuke Goto, Musashino (JP); Kiyohiko Itokawa, Musashino (JP); Yasuyoshi Kojima, Musashino (JP); Kazumitsu Sakamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 9 days.

(21) Appl. No.: 18/265,627

(22) PCT Filed: Dec. 24, 2020

(86) PCT No.: PCT/JP2020/048491
§ 371 (c)(1),
(2) Date: Jun. 6, 2023

(87) PCT Pub. No.: WO2022/137445
PCT Pub. Date: Jun. 30, 2022

(65) Prior Publication Data
US 2024/0048206 A1 Feb. 8, 2024

(51) Int. Cl.
*H04B 7/06* (2006.01)
*H04B 7/08* (2006.01)
*H04L 25/02* (2006.01)

(52) U.S. Cl.
CPC ......... *H04B 7/0634* (2013.01); *H04B 7/0808* (2013.01); *H04L 25/0202* (2013.01)

(58) Field of Classification Search
CPC ... H04L 1/1812; H04L 1/1822; H04L 1/1896; H04L 1/1854; H04L 1/1861; H04L 1/08;
(Continued)

(56) References Cited

U.S. PATENT DOCUMENTS

| 5,856,804 A | 1/1999 | Turcotte et al. |
| 11,542,040 B1 * | 1/2023 | Hemmati ........... H04B 7/18576 |

(Continued)

FOREIGN PATENT DOCUMENTS

JP  10145260 A  5/1998

OTHER PUBLICATIONS

Takayuki Nakanishi et al., "Null Beam Forming by Amplitude and Phase Control for Multiple-Beam Phased Array Antennas", The Institute of Electronics, Information and Communication Engineers, IEICE Technical Report, SANE2011-19(Jun. 2011).
(Continued)

*Primary Examiner* — Eva Y Puente
(74) *Attorney, Agent, or Firm* — Harness, Dickey & Pierce, P.L.C.

(57) ABSTRACT

A transceiver includes: a plurality of antennas that performs communication with one or more first communication apparatuses serving as reference at the time of forming a communication area and a second communication apparatus located near the one or more first communication apparatuses; a channel estimation unit configured to perform channel estimation for each of the one or more first communication apparatuses based on a known reference signal transmitted from the one or more first communication apparatuses; and an antenna control unit configured to control the plurality of antennas using an estimation value obtained by the channel estimation to form a beam having directivity in a direction in which the one or more first communication apparatuses are located. According to the control of the
(Continued)

antenna control unit, the plurality of antennas forms a transmission beam in a communication area formed in a predetermined range including the one or more first communication apparatuses or forms a reception beam for receiving a signal transmitted from the second communication apparatus located in the communication area.

6 Claims, 5 Drawing Sheets

(58) Field of Classification Search
CPC ...... H04L 1/1864; H04L 5/001; H04W 84/06; H04W 16/10; H04W 4/02; H04W 4/022; H04W 4/027; H04W 16/14; H04W 24/04; H04W 24/06; H04W 72/23; H04B 7/18513; H04B 7/0617; H04B 7/1851; H04B 7/195; H04B 7/2041; H04B 7/18519; H04B 7/0408; H04B 7/086
USPC ........................................................ 375/262
See application file for complete search history.

(56) References Cited

U.S. PATENT DOCUMENTS

| | | | |
|---|---|---|---|
| 2016/0365911 A1* | 12/2016 | Van Buren | H04B 7/0617 |
| 2021/0249782 A1* | 8/2021 | Angeletti | H01Q 25/00 |
| 2022/0131602 A1* | 4/2022 | Liberg | H04B 7/18504 |
| 2023/0179286 A1* | 6/2023 | Nardini | H01Q 3/267 |
| | | | 343/702 |
| 2024/0007155 A1* | 1/2024 | Åström | H04B 7/0695 |
| 2024/0030601 A1* | 1/2024 | Salazar | H01Q 1/007 |

OTHER PUBLICATIONS

Vasavada, Y. et al., "Determination of locations of calibration earth stations for ground based beam forming in satellite systems", MILCOM 2017—2017 IEEE Military Communications Conference (MILCOM), Oct. 23, 2017, pp. 331-336.

* cited by examiner

TRANSCEIVER, WIRELESS COMMUNICATION SYSTEM AND WIRELESS COMMUNICATION METHOD

CROSS-REFERENCE TO RELATED APPLICATIONS

This application is a 371 National Stage of International Application No. PCT/JP2020/048491, filed on Dec. 24, 2020. The entire disclosures of the above applications are incorporated herein by reference.

TECHNICAL FIELD

The present invention relates to a transceiver, a wireless communication system and a wireless communication method.

BACKGROUND ART

A technique for tracking using a beamforming technology has been proposed in intersatellite communication between a data relay satellite on a geostationary orbit and a low earth orbit satellite (see, for example, Non Patent Literature 1).

CITATION LIST

Non Patent Literature

Non Patent Literature 1: Takayuki Nakanishi, et al. "Null beam forming by amplitude and phase control for multiple-beam phased array antennas", IEICE Technical Report. SANE, Space, Aeronautical and Navigational Electronics 111.90 (2011): 11-16.

SUMMARY OF INVENTION

Technical Problem

It is desired to improve service using the above-described beamforming technology. Such a problem occurs not only in a case where beamforming is performed in intersatellite communication, but also in a case where communication is performed between communication devices located on the ground using the beamforming technology.

In view of the above circumstances, an object of the present invention is to provide a technique capable of improving service using a beamforming technology.

Solution to Problem

One aspect of the present invention is a transceiver in a wireless communication system including one or more first communication apparatuses serving as reference at the time of forming a communication area, a second communication apparatus located near the one or more first communication apparatuses, and a transceiver that moves, the transceiver including: a plurality of antennas that performs communication with the one or more first communication apparatuses and the second communication apparatus located near the one or more first communication apparatuses; a channel estimation unit that performs channel estimation for each of the one or more first communication apparatuses based on a known reference signal transmitted from the one or more first communication apparatuses; and an antenna control unit that controls the plurality of antennas using an estimation value obtained by the channel estimation to form a beam having directivity in a direction in which the one or more first communication apparatuses are located, in which according to the control of the antenna control unit, the plurality of antennas forms a transmission beam in a communication area formed in a predetermined range including the one or more first communication apparatuses or forms a reception beam for receiving a signal transmitted from the second communication apparatus located in the communication area.

One aspect of the present invention is a wireless communication system including one or more first communication apparatuses serving as reference at the time of forming a communication area, a second communication apparatus located near the one or more first communication apparatuses, and a transceiver that moves, in which the one or more first communication apparatuses transmit a reference signal including at least identification information to the transceiver at a communicable timing with the transceiver, the transceiver includes a plurality of antennas that performs communication with the one or more first communication apparatuses serving as the reference at the time of forming the communication area and the second communication apparatus located near the one or more first communication apparatuses, a channel estimation unit that performs channel estimation for each of the one or more first communication apparatuses based on the reference signal transmitted from the one or more first communication apparatuses, and an antenna control unit that controls the plurality of antennas using an estimation value obtained by the channel estimation to form a beam having directivity in a direction in which the one or more first communication apparatuses are located, and according to the control of the antenna control unit, the plurality of antennas forms a transmission beam in a communication area formed in a predetermined range including the one or more first communication apparatuses or forms a reception beam for receiving a signal transmitted from the second communication apparatus located in the communication area.

One aspect of the present invention is a wireless communication method in a wireless communication system including one or more first communication apparatuses serving as reference at the time of forming a communication area, a second communication apparatus located near the one or more first communication apparatuses, and a transceiver that moves, the method including: performing channel estimation for each of the one or more first communication apparatuses based on a known reference signal transmitted from one or more communication devices serving as reference at the time of forming a communication area; controlling a plurality of antennas using an estimation value obtained by the channel estimation to form a beam having directivity in a direction in which the one or more first communication apparatuses are located; and forming a transmission beam in a communication area formed in a predetermined range including the one or more first communication apparatuses, or forming a reception beam for receiving a signal transmitted from the second communication apparatus located in the communication area.

Advantageous Effects of Invention

According to the present invention, it is possible to improve service by using a beamforming technology.

DESCRIPTION OF EMBODIMENTS

Embodiments of the present invention are now described in detail with reference to the drawings.

(Outline)

Figure 1:
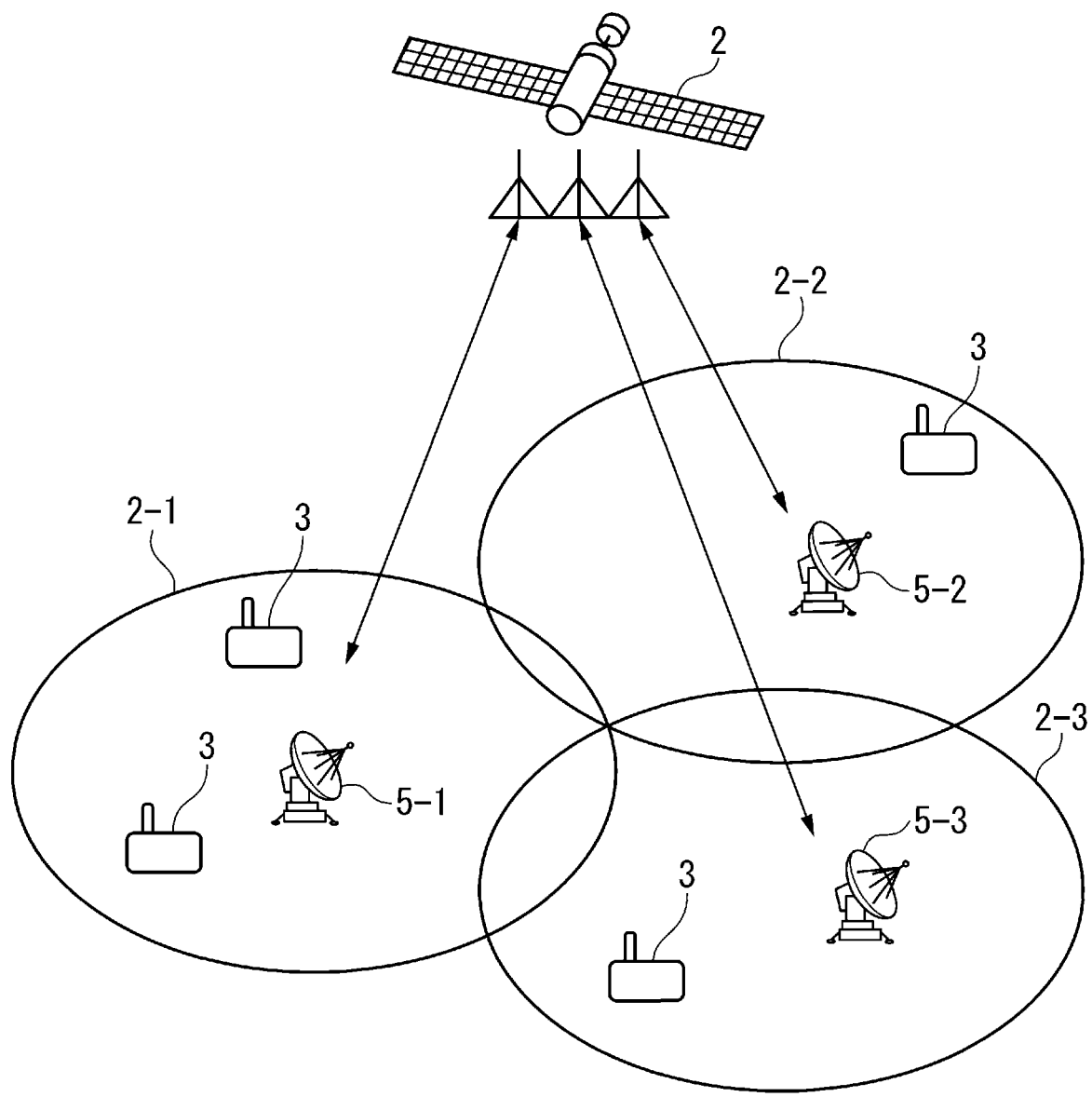
FIG. 1 is a diagram for describing an outline of a wireless communication system in the present invention.

FIG. 1 is a diagram for describing an outline of a wireless communication system in the present invention. As illustrated in FIG. 1, the wireless communication system in the present invention includes at least a mobile relay station 2, one or more terminal stations 3, and one or more reference stations 5. FIG. 1 illustrates, as an example, a case where three reference stations 5 are provided. It is assumed that the terminal station 3 is located near the reference station 5. When reference stations 5-1 to 5-3 can communicate with the mobile relay station 2, they transmit known reference signals to the mobile relay station 2. The reference signal is a known signal having a predetermined pattern with the mobile relay station 2, and includes at least identification information of the reference station 5.

The mobile relay station 2 receives the reference signal transmitted from each of the reference stations 5-1 to 5-3 by each antenna. The mobile relay station 2 performs channel estimation for each reference station 5 based on the received reference signal. The mobile relay station 2 uses an estimation value obtained by the channel estimation to form a beam such that interference between the reference stations 5 is reduced. As a result, as illustrated in FIG. 1, the mobile relay station 2 forms a beam having directivity in a direction in which each of the reference stations 5-1 to 5-3 is located, and as a result, the mobile relay station 2 forms communication areas 2-1 to 2-3 having predetermined sizes with reference to the reference stations 5-1 to 5-3. Therefore, the terminal stations 3 located in the communication areas 2-1 to 2-3 can communicate with the mobile relay station 2. Then, each terminal station 3 communicates with the mobile relay station 2.

As described above, in the present invention, the communication area for the terminal station 3 is formed with reference to the reference station 5. Hereinafter, a specific configuration will be described.

First Embodiment

Figure 2:
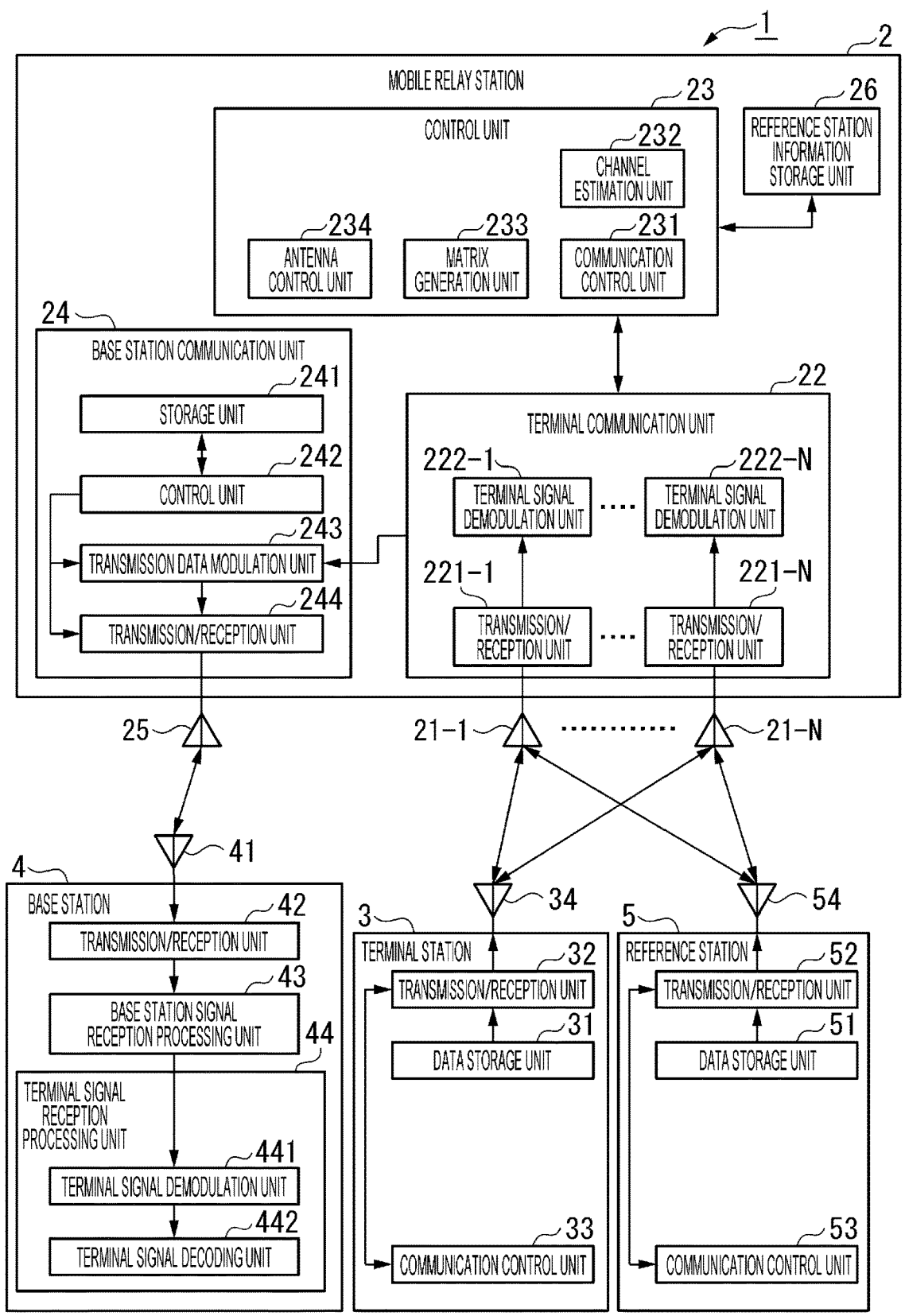
FIG. 2 is a configuration diagram of a wireless communication system according to a first embodiment.

FIG. 2 is a configuration diagram of a wireless communication system 1 according to a first embodiment. The wireless communication system 1 includes the mobile relay station 2, the one or more terminal stations 3, a base station 4, and the one or more reference stations 5. The number of each of the mobile relay stations 2, the terminal stations 3, the base stations 4, and the reference stations 5 included in the wireless communication system 1 is arbitrary. It is assumed that the number of terminal stations 3 is large.

The mobile relay station 2 is an example of a relay device mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. The mobile relay station 2 receives each data transmitted from each of the plurality of terminal stations 3 by a radio signal while moving above the earth. In the mobile relay station 2 according to the present invention, a communicable area for receiving data from each of the plurality of terminal stations 3 is formed with reference to the reference station 5. The mobile relay station 2 wirelessly transmits the received data to the base station 4. Hereinafter, a signal transmitted from the mobile relay station 2 to the terminal station 3 and the base station 4 will be referred to as downlink signals.

The terminal station 3 collects data such as environmental data detected by a sensor and wirelessly transmits the collected data to the mobile relay station 2. For example, when a transmission timing is instructed from the mobile relay station 2, the terminal station 3 wirelessly transmits the collected data to the mobile relay station 2 at the instructed transmission timing. The terminal station 3 is, for example, an Internet of Things (IoT) terminal. It is assumed that the reference station 5 is located near the terminal station 3. The terminal station 3 is an aspect of a second communication apparatus.

The base station 4 receives the data collected by the terminal station 3 from the mobile relay station 2.

The reference station 5 is a reference device at the time of forming a communication area. For example, the reference station 5 is arranged in the vicinity of a place where the terminal station 3 is arranged. At a timing at which the reference station 5 can communicate with the mobile relay station 2, the reference station 5 generates a reference signal including at least identification information of the reference station 5, and transmits the generated reference signal to the mobile relay station 2. The timing at which communication with the mobile relay station 2 can be performed may be, for example, a timing at which a downlink signal transmitted from the mobile relay station 2 is received, or a timing at which the LEO is located in the vicinity of the reference station 5 on the basis of orbit information of the LEO satellite on which the mobile relay station 2 is mounted in a case where the orbit information is held. The LEO orbit information is information capable of obtaining a position, a velocity, a movement direction, and the like of the LEO satellite at an arbitrary time. Transmission time may be represented by, for example, an elapsed time from a transmission start timing. The reference station 5 is an aspect of a first communication apparatus.

The terminal station 3, the base station 4, and the reference station 5 are installed at specific positions on the earth such as on the ground and on the sea. Hereinafter, a signal transmitted from each of the terminal station 3 and the reference station 5 to the mobile relay station 2 is referred to as a terminal uplink signal.

It is conceivable to use a relay device mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow.

Furthermore, drones require batteries and HAPS require solar panels. In the present embodiment, the mobile relay station 2 is mounted on the LEO satellite. Therefore, in addition to keeping the link budget within a limit, the LEO satellite has no air resistance and consumes less fuel because it orbits outside the atmosphere. In addition, a footprint is also larger than that in a case where the relay station is mounted on the drone or the HAPS.

The mobile relay station 2 mounted on the LEO satellite forms a beam having directivity in a direction of the reference station 5 installed on the ground. At this time, the mobile relay station 2 forms a beam such that a center frequency of the beam faces the position of the reference station 5. Therefore, the beam can be directed to the reference station 5, and stable beamforming control can be performed. That is, even when the LEO satellite constantly moves, the beam can be directed in a desired direction without interference.

Furthermore, since the beam is formed toward the reference station 5, a communication area having a predetermined size can be formed with reference to the reference station 5. Therefore, the terminal station 3 located in the communication area can communicate with the mobile relay station 2.

A configuration of each device will be described.

The mobile relay station 2 includes N antennas 21 (N is an integer of 2 or more), a terminal communication unit 22, a control unit 23, a base station communication unit 24, a plurality of antennas 25, and a reference station information storage unit 26. The N antennas 21 are referred to as antennas 21-1 to 21-N.

The terminal communication unit 22 includes N transmission/reception units 221 and N terminal signal demodulation units 222. The N transmission/reception units 221 are referred to as transmission/reception units 221-1 to 221-N. The N terminal signal demodulation units 222 are referred to as terminal signal demodulation units 222-1 to 222-N.

A transmission/reception unit 221-$n$ ($n$ is an integer between 1 and N (inclusive)) receives a terminal uplink signal through an antenna 21-$n$. In this manner, the transmission/reception unit 221-$n$ communicates with one or more terminal stations 3 and one or more reference stations 5 using the antenna 21-$n$.

A terminal signal demodulation unit 222-$n$ ($n$ is an integer between 1 and N (inclusive)) demodulates the terminal uplink signal received by the transmission/reception unit 221-$n$, and outputs a demodulation result to the control unit 23 or the base station communication unit 24. For example, in a case where data collected by the sensor is included in the demodulation result, the terminal signal demodulation unit 222-$n$ outputs the demodulation result to the base station communication unit 24. For example, in a case where a known pattern representing a reference signal is included in the demodulation result, the terminal signal demodulation unit 222-$n$ outputs the demodulation result to the control unit 23.

The demodulation performed by the terminal signal demodulation unit 222-$n$ includes, for example, frequency conversion for converting a radio frequency (RF) signal received by the transmission/reception unit 221-$n$ into a baseband signal, and frame detection for detecting uplink signals transmitted from the terminal station 3 and the reference station 5. Furthermore, for example, in a case where the terminal signal demodulation unit 222-$n$ performs digital processing, the terminal signal demodulation unit 222-$n$ performs analog-to-digital conversion.

The control unit 23 includes a processor such as a central processing unit (CPU) and a memory. The control unit 23 implements functions of a communication control unit 231, a channel estimation unit (channel estimator) 232, a matrix generation unit 233, and an antenna control unit (antenna controller) 234 by executing a program. Some or all of these function units may be implemented by hardware (a circuit unit, including circuitry) such as an application specific integrated circuit (ASIC), a programmable logic device (PLD), or a field programmable gate array (FPGA), or by cooperation of software and hardware. Some of these functions need not be mounted in the mobile relay station 2 in advance, and may be implemented by installing an additional application program in the mobile relay station 2.

The communication control unit 231 controls transmission of a downlink signal. For example, the communication control unit 231 controls the terminal communication unit 22 to transmit the downlink signal at a predetermined timing. The predetermined timing may be constant, may be a timing at which the mobile relay station 2 moves to a predetermined position, may be a timing at which predetermined time has come, or may be a timing at which the mobile relay station moves to a place where the reference station 5 is located.

The channel estimation unit 232 performs channel estimation for each reference station 5 based on a known reference signal transmitted from the reference station 5.

The matrix generation unit 233 generates a weight matrix for each estimation value by using the estimation value obtained by the channel estimation. For the generation of the weight matrix by the matrix generation unit 233, a zero forcing (ZF) method, a minimum mean-square-error (MMSE) method, or the like is used. Note that the generation of the weight matrix is not limited to the above, and other methods may be used as long as the weight matrix can be generated. When the ZF method is used to generate the weight matrix, an inverse matrix of a channel estimation matrix may be used as the weight matrix.

The antenna control unit 234 controls the plurality of antennas 21-N using each weight matrix to form a beam having directivity in a direction in which each reference station 5 is located. For example, the antenna control unit 234 controls some antennas 21 of the plurality of antennas 21 by using a weight matrix generated from an estimation value obtained from a reference signal transmitted from the reference station 5-1, and forms a beam having directivity in a direction in which the reference station 5-2 is located. The beam transmitted by the antenna control unit 234 in the direction in which the reference station 5 is located may be a single beam or multiple beams. The antenna control unit 234 uses digital beamforming control for beam formation.

The plurality of antennas 21 forms a transmission beam in a communication area formed in a predetermined range including the reference station 5 under the control of the antenna control unit 234. The plurality of antennas 21 forms a reception beam for receiving a signal transmitted from the terminal station 3 located in the communication area formed in the predetermined range including the reference station 5 under the control of the antenna control unit 234. In the following description, a case where the plurality of antennas 21 forms the reception beam will be described as an example.

The base station communication unit 24 transmits reception waveform information to the base station 4 by a downlink signal of an arbitrary wireless communication system. The base station communication unit 24 includes a storage unit 241, a control unit 242, a transmission data modulation unit 243, and a transmission/reception unit 244.

The storage unit 241 stores a transmission start timing calculated in advance on the basis of the orbit information of the LEO satellite on which the mobile relay station 2 is mounted and the position of the base station 4.

The control unit 242 controls the transmission data modulation unit 243 and the transmission/reception unit 244 to transmit the reception waveform information to the base station 4 at the transmission start timing stored in the storage unit 241.

The transmission data modulation unit 243 reads the reception waveform information output from the terminal communication unit 22 as transmission data, and modulates the read transmission data to generate a base station downlink signal.

The transmission/reception unit 244 converts the base station downlink signal from an electrical signal into a radio signal and transmits the radio signal from the antenna 25.

The reference station information storage unit 26 stores information on the reference station 5. For example, the reference station information storage unit 26 stores identification information and position information of the reference station 5 as information on the reference station 5. The reference station information storage unit 26 is formed using a storage device such as a magnetic storage device or a semiconductor storage device.

The terminal station 3 includes a data storage unit 31, a transmission/reception unit 32, a communication control unit 33, and an antenna 34. Note that the terminal station 3 may include a plurality of antennas 34.

The data storage unit 31 stores sensor data.

The transmission/reception unit 32 communicates with the mobile relay station 2. For example, the transmission/reception unit 32 reads sensor data from the data storage unit 31 as terminal transmission data in response to an instruction from the communication control unit 33. The transmission/reception unit 32 wirelessly transmits a terminal uplink signal in which the read terminal transmission data is set from the antenna 34.

The transmission/reception unit 32 transmits and receives signals by low power wide area (LPWA), for example. The LPWA includes LoRaWAN (registered trademark), Sigfox (registered trademark), long term evolution for machines (LTE-M), narrow band (NB)-IoT, and the like, but any wireless communication system can be used. The transmission/reception unit 32 may perform transmission/reception with another terminal station 3 by time division multiplexing, orthogonal frequency division multiplexing (OFDM), or the like. The transmission/reception unit 32 may perform beamforming of signals transmitted from the plurality of antennas 34 by a method determined in advance in the wireless communication system to be used.

The communication control unit 33 causes the transmission/reception unit 32 to transmit the sensor data stored in the data storage unit 31 at a transmission timing instructed from the mobile relay station 2.

The base station 4 includes an antenna 41, a transmission/reception unit 42, a base station signal reception processing unit 43, and a terminal signal reception processing unit 44. The transmission/reception unit 42 converts a terminal downlink signal received by the antenna 41 into an electrical signal. The base station signal reception processing unit 43 demodulates and decodes the reception signal converted into the electrical signal by the transmission/reception unit 42 to obtain reception waveform information. The base station signal reception processing unit 43 outputs the reception waveform information to the terminal signal reception processing unit 44.

The terminal signal reception processing unit 44 performs reception processing of a terminal uplink signal indicated by the reception waveform information. At this time, the terminal signal reception processing unit 44 performs reception processing according to the wireless communication system used for transmission by the terminal station 3 to acquire terminal transmission data. The terminal signal reception processing unit 44 includes a terminal signal demodulation unit 441 and a terminal signal decoding unit 442.

The terminal signal demodulation unit 441 demodulates waveform data and outputs a symbol obtained by the demodulation to the terminal signal decoding unit 442. The terminal signal demodulation unit 441 may demodulate a signal indicated by the waveform data after performing processing of compensating for a Doppler shift of the terminal uplink signal received by the antenna 21 of the mobile relay station 2. The Doppler shift received by the terminal uplink signal received by the antenna 21 is calculated in advance on the basis of the position of the terminal station 3 and the orbit information of the LEO on which the mobile relay station 2 is mounted. The terminal signal decoding unit 442 decodes the symbol demodulated by the terminal signal demodulation unit 441, and obtains the terminal transmission data transmitted from the terminal station 3.

The reference station 5 includes a data storage unit 51, a transmission/reception unit 52, a communication control unit 53, and an antenna 54. Note that the reference station 5 may include a plurality of antennas 54.

The data storage unit 51 stores identification information of the reference station 5.

The transmission/reception unit 52 communicates with the mobile relay station 2. For example, the transmission/reception unit 52 reads the identification information of the reference station 5 from the data storage unit 31 in response to an instruction from the communication control unit 53. The transmission/reception unit 52 wirelessly transmits a reference signal including the read identification information from the antenna 54 as a terminal uplink signal.

The transmission/reception unit 52 transmits and receives signals by LPWA, for example. The transmission/reception unit 52 may perform beamforming of signals transmitted from the plurality of antennas 54 by a method determined in advance in the wireless communication system to be used.

The communication control unit 53 causes the transmission/reception unit 52 to transmit the reference signal at a communicable timing with the mobile relay station 2.

An operation of the wireless communication system 1 is now described.

Figure 3:
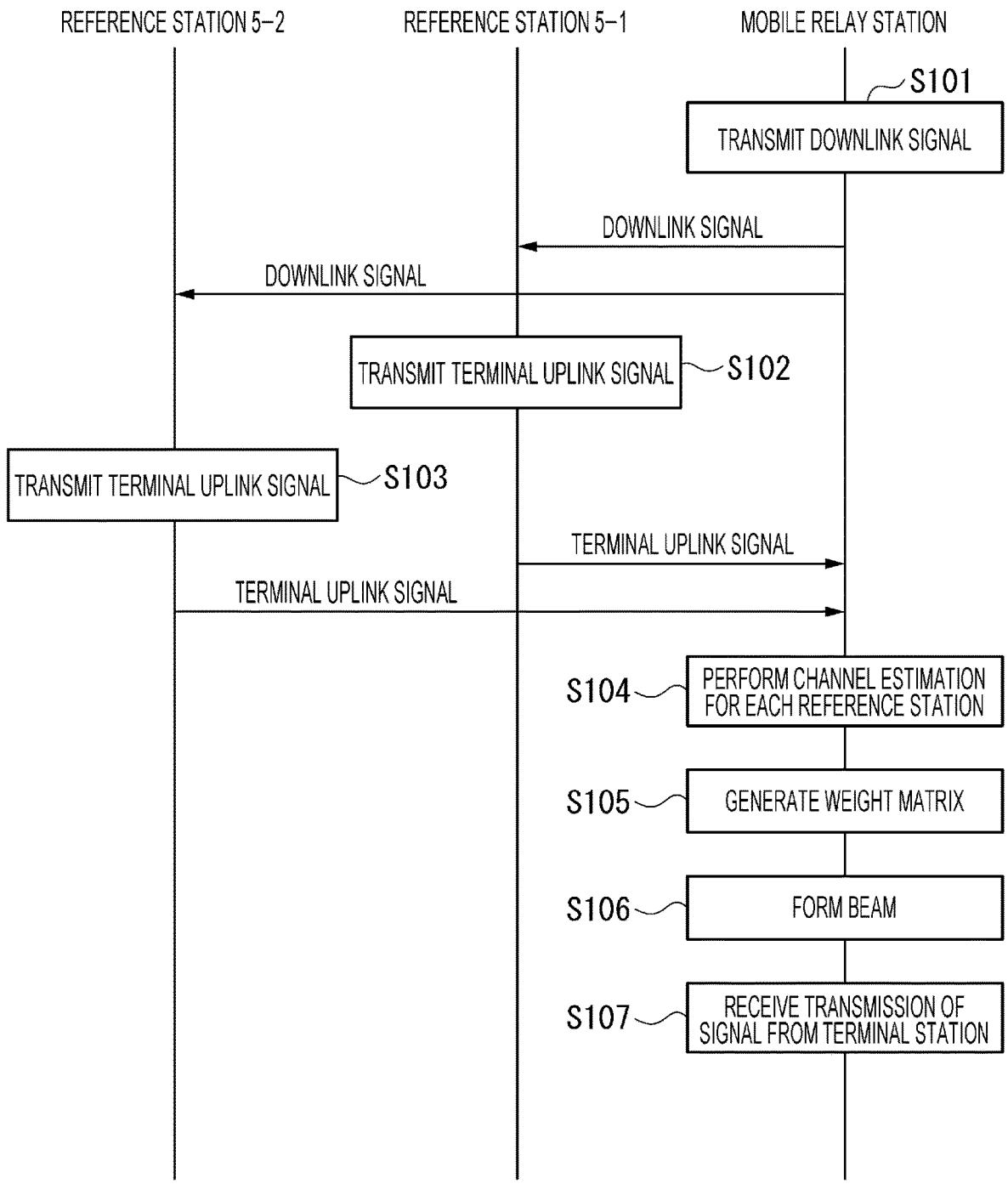
FIG. 3 is a sequence diagram illustrating a flow of beamforming control processing of the wireless communication system according to the first embodiment.

FIG. 3 is a sequence diagram illustrating a flow of beamforming control processing of the wireless communication system 1 according to the first embodiment. In the description of FIG. 3, a case where the wireless communication system 1 includes the two reference stations 5 (reference stations 5-1 and 5-2) will be described as an example. In order to distinguish functional units of the two reference stations 5-1 and 5-2, branch numbers "−1" or "−2" are added to the respective functional units. In the following description, it is assumed that the processing of FIG. 3 is executed at a timing when the mobile relay station 2 is located near the reference station 5.

The communication control unit 231 of the mobile relay station 2 controls the terminal communication unit 22 to transmit a downlink signal at a timing when the mobile relay station 2 is located near the reference station 5. Here, whether or not the mobile relay station 2 is located near the reference station 5 is determined based on the reference station information storage unit 26 and the orbit information of the mobile relay station 2. The reference station information storage unit 26 stores position information of each reference station 5. Therefore, the communication control unit 231 can grasp the position of the mobile relay station 2 based on the orbit information of the mobile relay station 2 and the position of each reference station 5. The communication control unit 231 controls the terminal communication unit 22 to transmit a downlink signal when the position of the mobile relay station 2 is located within a predetermined range with at least one reference station 5.

The terminal communication unit 22 transmits the downlink signal according to the control of the communication control unit 231 (step S101). That is, the mobile relay station 2 transmits the downlink signal within a communication range of the transmission/reception units 221-1 to 221-N via the transmission/reception units 221-1 to 221-N. Here, the downlink signal transmitted by the mobile relay station 2 includes information indicating that transmission is permitted to the reference station 5. When the reference station 5 is located within the communication range of the transmission/reception units 221-1 to 221-N, the reference station 5 receives the downlink signal. Here, it is assumed that the reference stations 5-1 and 5-2 are located within the communication ranges of any of the transmission/reception units 221-1 to 221-N. The reference stations 5-1 and 5-2 receive the downlink signals transmitted from the mobile relay station 2.

Upon receiving the downlink signal transmitted from the mobile relay station 2, a transmission/reception unit 52-1 wirelessly transmits a known reference signal including identification information of the reference station 5-1 stored in a data storage unit 51-1 from an antenna 55-1 as a terminal uplink signal under the control of a communication control unit 53-1 (step S102).

Upon receiving the downlink signal transmitted from the mobile relay station 2, a transmission/reception unit 52-2 wirelessly transmits a known reference signal including identification information of the reference station 5-2 stored in a data storage unit 51-2 from an antenna 55-2 as a terminal uplink signal under the control of a communication control unit 53-2 (step S103).

Each of the transmission/reception units 221-1 to 221-N receives the terminal uplink signal transmitted from each reference station 5. The terminal signal demodulation units 222-1 to 222-N demodulate the terminal uplink signals received by the transmission/reception units 221-1 to 221-N, and output demodulation results to the control unit 23. The channel estimation unit 232 performs channel estimation between the mobile relay station 2 and each reference station 5 using the demodulated reference signal (step S104). The channel estimation unit 232 outputs an estimation value obtained by the channel estimation between the mobile relay station 2 and each reference station 5 to the matrix generation unit 233.

The matrix generation unit 233 generates a weight matrix for each reference station 5 using the estimation value output from the channel estimation unit 232 (step S105). The matrix generation unit 233 outputs information of the generated weight matrix to the antenna control unit 234. The antenna control unit 234 controls the plurality of antennas 21-N using each weight matrix to form a beam (for example, a reception beam) having directivity in a direction in which each of the reference stations 5-1 and 5-2 is located (step S106). More specifically, the antenna control unit 234 forms a beam having directivity in the direction in which the reference station 5-1 is located using some antennas 21-1 to 21-n-1 of the plurality of antennas 21-N. Furthermore, the antenna control unit 234 uses the remaining antennas 21-n to 21-N of the plurality of antennas 21-N to form a beam having directivity in the direction in which the reference station 5-2 is located.

By the above processing, a communicable area based on the reference station 5-1 is formed in the vicinity of the reference station 5-1, and a communicable area based on the reference station 5-2 is formed in the vicinity of the reference station 5-2. Thereafter, the mobile relay station 2 receives transmission from the terminal station 3 located within the communicable area (step S107). The communication control unit 33 of the terminal station 3 located in the vicinity of the reference station 5-1 and located in the communicable area causes the transmission/reception unit 32 to transmit sensor data stored in the data storage unit 31 at a transmission timing instructed from the mobile relay station 2. The transmission/reception unit 32 transmits the sensor data under the control of the communication control unit 33. The communication control unit 33 of the terminal station 3 located in the vicinity of the reference station 5-2 and located in the communicable area causes the transmission/reception unit 32 to transmit sensor data stored in the data storage unit 31 at a transmission timing instructed from the mobile relay station 2. The transmission/reception unit 32 transmits the sensor data under the control of the communication control unit 33.

According to the wireless communication system 1 configured as described above, the mobile relay station 2 forms a beam having directivity in a direction in which the reference station 5 is located on the basis of a signal transmitted from the reference station 5. Specifically, the mobile relay station 2 performs channel estimation on the basis of the signal transmitted from the reference station 5, and forms a beam having directivity in a direction in which the reference station 5 is located using a weight matrix obtained from a channel estimation result. Therefore, stable beamforming control can be performed. As a result, a communicable area can be formed around the reference station 5, and communication with the terminal station 3 located in the communicable area becomes possible. Therefore, it is possible to improve service by using a beamforming technology.

Second Embodiment

In a second embodiment, a configuration in which a timing at which the mobile relay station 2 directs a beam toward the reference station 5 is switched every time will be described.

In the second embodiment, a basic system configuration is similar to that of the first embodiment. Hereinafter, differences from the first embodiment will be described.

Figure 4:
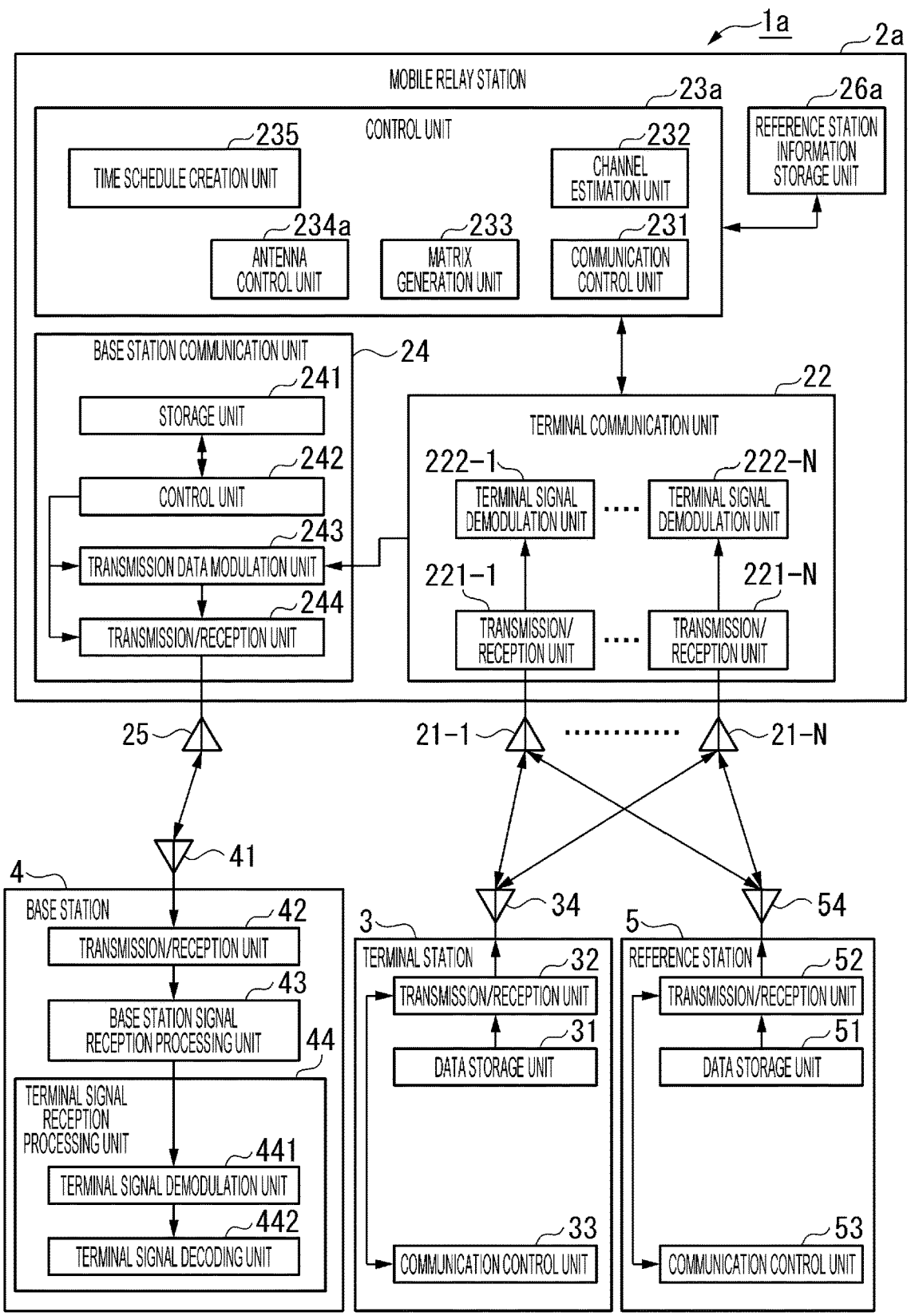
FIG. 4 is a configuration diagram of a wireless communication system according to a second embodiment.

FIG. 4 is a configuration diagram of a wireless communication system 1a according to the second embodiment. The wireless communication system 1a includes a mobile relay station 2a, the one or more terminal stations 3, the base station 4, and the one or more reference stations 5. The number of each of the mobile relay stations 2a, the terminal stations 3, the base stations 4, and the reference stations 5 included in the wireless communication system 1a is arbitrary.

The mobile relay station 2a includes the N antennas 21, the terminal communication unit 22, a control unit 23a, the base station communication unit 24, the plurality of antennas 25, and a reference station information storage unit 26a.

The control unit 23a includes a processor such as a CPU and a memory. The control unit 23a implements functions of the communication control unit 231, the channel estimation unit 232, the matrix generation unit 233, an antenna control unit 234a, and a time schedule creation unit (time schedule creator) 235 by executing a program. Some or all of these functional units may be implemented by hardware (circuit unit, including circuitry) such as ASIC, PLD, or FPGA, or by cooperation of software and hardware. Some of these functions need not be mounted in the mobile relay station 2a in advance, and may be implemented by installing an additional application program in the mobile relay station 2a.

The control unit 23a is different from the control unit 23 in that the antenna control unit 234a is provided instead of the antenna control unit 234 and that the time schedule creation unit 235 is newly provided. Other configurations of the control unit 23a are similar to those of the control unit 23. Therefore, a description of the entire control unit 23a will be omitted, and the antenna control unit 234a and the time schedule creation unit 235 will be described.

The time schedule creation unit 235 creates a time schedule indicating a timing of forming a beam having directivity in a direction in which the reference station 5 is located on the basis of the orbit information of the mobile relay station 2 and the position information of the reference station 5.

According to the time schedule created by the time schedule creation unit 235, the antenna control unit 234a controls the plurality of antennas 21-N using a weight matrix obtained from an estimation value of the corresponding reference station 5, and forms a beam having directivity in a direction in which each reference station 5 is located. That is, the antenna control unit 234a switches a timing of forming the beam having directivity in the direction in which the reference station 5 is located with time.

The reference station information storage unit 26a stores information on the reference station 5. For example, the reference station information storage unit 26a stores identification information, position information, and a channel estimation value of the reference station 5 as information on the reference station 5. The reference station information storage unit 26a is configured using a storage device such as a magnetic storage device or a semiconductor storage device.

An operation of the wireless communication system 1a is now described.

Figure 5:
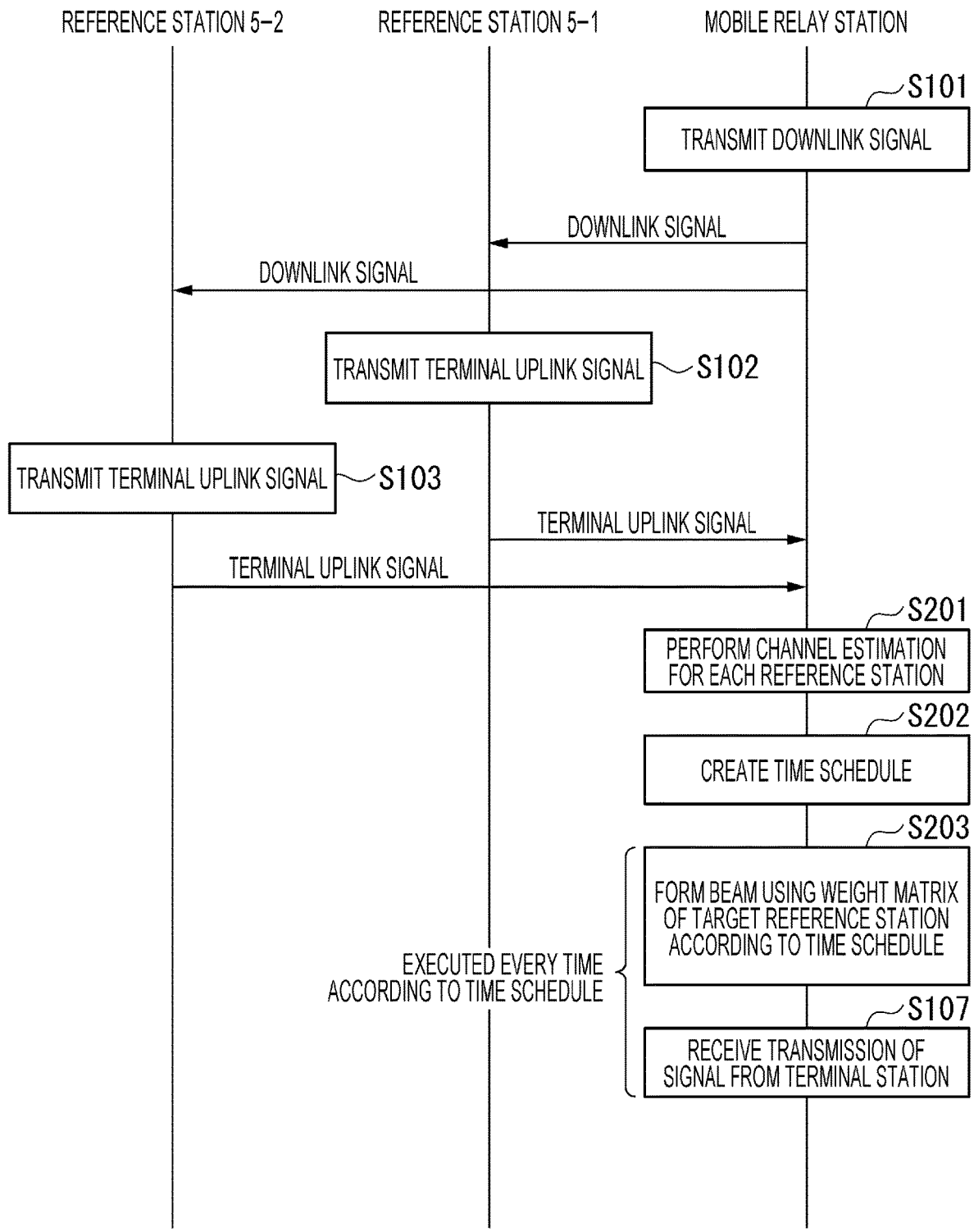
FIG. 5 is a sequence diagram illustrating a flow of beamforming control processing of the wireless communication system according to the second embodiment.

FIG. 5 is a sequence diagram illustrating a flow of beamforming control processing of the wireless communication system 1a according to the second embodiment. In the description of FIG. 5, a case where the wireless communication system 1a includes the two reference stations 5 (reference stations 5-1 and 5-2) will be described as an example. Further, in FIG. 5, the same processing steps as those in FIG. 3 are denoted by the same reference numerals as those used in FIG. 3, and explanation thereof will be omitted.

When the processing from step S101 to step S103 is executed, each of the transmission/reception units 221-1 to 221-N receives a terminal uplink signal transmitted from each reference station 5. The terminal signal demodulation units 222-1 to 222-N demodulate the terminal uplink signals received by the transmission/reception units 221-1 to 221-N, and output demodulation results to the control unit 23. The channel estimation unit 232 performs channel estimation between the mobile relay station 2a and each reference station 5 using the demodulated reference signal (step S201). The channel estimation unit 232 stores an estimation value obtained by the channel estimation in the reference station information storage unit 26a.

The time schedule creation unit 235 creates a time schedule on the basis of the orbit information of the mobile relay station 2 and the position information of the reference station 5 (step S202). For example, the time schedule creation unit 235 may create a time schedule so that beamforming control to the reference station 5 close to a current position of the mobile relay station 2 obtained from the orbit information of the mobile relay station 2 is accelerated, or may create a time schedule by randomly allocating the reference station 5 every time. No that, in creating the time schedule, the same reference station 5 may be continuously allocated, or each reference station 5 may be allocated in order.

Here, an example will be described. As illustrated in FIG. 5, when the reference stations 5-1 and 5-2 are located at positions communicable with the mobile relay station 2a, the time schedule creation unit 235 creates a time schedule in which the reference station 5-1 and the reference station 5-2 are alternately switched every several seconds (for example, one second). The time schedule creation unit 235 outputs the created time schedule to the antenna control unit 234a.

The antenna control unit 234a forms a beam having directivity in a direction in which the target reference station 5 is located according to the time schedule created by the time schedule creation unit 235 (step S203). In a case of the above example, first, the antenna control unit 234a forms a beam having directivity in a direction in which the reference station 5-1 is located. Specifically, the antenna control unit 234a causes the matrix generation unit 233 to generate a weight matrix using an estimation value of the reference station 5-1.

In accordance with an instruction from the antenna control unit 234a, the matrix generation unit 233 acquires the estimation value corresponding to the reference station 5-1 from the reference station information storage unit 26a, and generates a weight matrix using the acquired estimation value. The matrix generation unit 233 outputs information of the generated weight matrix to the antenna control unit 234a. The antenna control unit 234a controls the plurality of antennas 21-N using the weight matrix output from the matrix generation unit 233 to form a beam (for example, a reception beam) having directivity in the direction in which the reference station 5-1 is located.

When a time determined in the time schedule has elapsed since the beam having directivity in the direction in which the reference station 5-1 is located is formed, the antenna control unit 234a then forms a beam having directivity in a direction in which the reference station 5-2 is located. Specifically, the antenna control unit 234a causes the matrix generation unit 233 to generate a weight matrix using an estimation value of the reference station 5-2.

In accordance with an instruction from the antenna control unit 234a, the matrix generation unit 233 acquires the estimation value corresponding to the reference station 5-2 from the reference station information storage unit 26a, and generates a weight matrix using the acquired estimation value. The matrix generation unit 233 outputs information of the generated weight matrix to the antenna control unit 234a. The antenna control unit 234a controls the plurality of antennas 21-N using the weight matrix output from the matrix generation unit 233 to form a beam (for example, a reception beam) having directivity in the direction in which the reference station 5-2 is located.

The mobile relay station 2a executes switching of the beamforming control as described above according to the time schedule. Note that, in the above example, the reference station 5-1 and the reference station 5-2 are alternately switched. However, in a case where there are three or more reference stations, beams directed to two reference stations 5 may be formed in the same time zone. That is, the time schedule may be created such that beams directed to the plurality of reference stations 5 are formed in the same time zone.

According to the wireless communication system 1*a* configured as described above, effects similar to those of the first embodiment can be obtained.

Furthermore, in the wireless communication system 1*a*, the timing at which the beam toward the reference station 5 is formed is switched according to the time schedule. As a result, even if the number of beams that can be simultaneously formed is limited, beams directed to the other reference stations 5 can be formed according to time. Hence, the number of installed reference stations 5 is not limited as compared with the first embodiment. Therefore, the degree of freedom of installation of the reference station 5 increases, and convenience can be improved.

Hereinafter, modifications of the first embodiment and the second embodiment will be described.

Since the mobile relay station 2, 2*a* constantly moves, it is assumed that a positional relationship between the mobile relay station 2, 2*a* and the reference station 5 changes. Therefore, the channel estimation unit 232 may be configured to appropriately perform channel estimation. In such a configuration, the channel estimation unit 232 instructs the communication control unit 231 to transmit a downlink signal at a timing when a predetermined time has elapsed since a previous channel estimation. The communication control unit 231 controls the terminal communication unit 22 to transmit the downlink signal in response to the instruction from the channel estimation unit 232. Thereafter, the mobile relay station 2, 2*a* executes the processing after step S104.

In each of the above embodiments, a case where the position of the reference station 5 is fixed has been described. Therefore, the mobile relay station 2, 2*a* can grasp the position of the reference station 5 by storing the position of the reference station 5 in advance. The reference station 5 may have a movable installation position. In such a configuration, the mobile relay station 2 updates the position information stored in the reference station information storage unit 26 each time the mobile relay station 2 acquires the position information from the reference station 5. The reference station 5 transmits a reference signal including the position information in addition to the identification information of the reference station 5 to the mobile relay station 2, 2*a*. The position information of the reference station 5 may be registered in the reference station 5 by a user at a place after the movement, or the reference station 5 may acquire the position information by position information acquisition means such as a global positioning system (GPS).

With the above configuration, the technology in the present invention can be applied even to a case where the position of the reference station 5 is moved.

In each of the above embodiments, the reference station 5 transmits the reference signal as the terminal uplink signal upon receiving the downlink signal transmitted from the mobile relay station 2. On the other hand, when the reference station 5 holds the orbit information of the mobile relay station 2 in advance, the reference station 5 may be configured to determine a communicable time of the mobile relay station 2 and transmit the reference signal as the terminal uplink signal. With such a configuration, the reference station 5 can grasp which time zone and which position the mobile relay station 2 is located at by referring to the orbit information of the mobile relay station 2. Therefore, the reference station 5 refers to the orbit information and transmits the reference signal as the terminal uplink signal in a time zone in which the mobile relay station 2 is located near the reference station 5 (for example, above the reference station 5).

In each of the above embodiments, the antenna control unit 234, 234*a* may be configured to control some antennas of the plurality of antennas 21 to form a null beam in order to suppress interference with a specific reference station 5 among the plurality of reference stations 5. Here, the specific reference station 5 is a reference station 5 that is not a target for forming a beam having directivity. For example, in FIG. 1, when the mobile relay station 2 forms beams having directivity with respect to the reference stations 5-1 and 5-2, the reference station 5-3 is the specific reference station 5. In this case, the antenna control unit 234, 234*a* controls some antennas of the plurality of antennas 21 to form a beam having directivity with respect to a direction in which each of the reference stations 5-1 and 5-2 is located and form a null beam with respect to a direction in which the reference station 5-3 is located. As a result, noise from the direction in which the reference station 5-3 is located can be suppressed.

The mobile relay station 2, 2*a* may be configured to select a place where a communicable area is to be formed on the basis of the orbit information and the position information of the reference station. Since the mobile relay station 2, 2*a* moves in the sky, it is assumed that the mobile relay station 2, 2*a* can communicate with many reference stations 5. Therefore, depending on the position of the mobile relay station 2, communication can be performed with the reference station 5 in which communication cannot be performed only by moving a little more. By forming a beam having directivity in the reference station 5 in which communication cannot be performed only by moving a little more, there is a case where a communicable area cannot be formed at a place where the communicable area should be originally formed in terms of the position of the mobile relay station 2. Therefore, the antenna control unit 234, 234*a* selects, from among the reference stations 5, the reference station 5 located at the place where the communicable area should be originally formed in terms of the position of the mobile relay station 2 on the basis of the position of the mobile relay station 2, 2*a* and the positional relationship between the mobile relay station 2, 2*a* and the reference station 5. The reference station 5 located at the place where the communicable area should be originally formed is a reference station 5 in which proximity between the position of the mobile relay station 2, 2*a* and the position of the reference station 5 is less than a threshold. Then, the antenna control unit 234, 234*a* forms a beam having directivity in the selected reference station 5. As a result, even when the number of installed reference stations 5 is large, it is possible to select an appropriate reference station 5.

The first embodiment and the second embodiment may be combined. In such a configuration, when a switching condition is satisfied, the antenna control unit 234 of the mobile relay station 2 changes the beamforming control processing currently executed to another beamforming control processing. The switching condition may be an instruction from the outside, may be set in a time zone, or may be set according to the position of the mobile relay station 2.

With such a configuration, switching can be freely performed at a timing when the switching is necessary. For example, by changing a setting between an area where the number of installed reference stations 5 is small and it is not necessary to switch the number of installed reference stations 5 with time and an area where the number of installed reference stations 5 is large and it is necessary to switch the number of installed reference stations 5 frequently, the beamforming control processing according to the location can be executed.

The antenna 21, the terminal communication unit 22, the control unit 23, 23a, and the reference station information storage unit 26 included in the mobile relay station 2, 2a may be configured as a moving transceiver. This transceiver may be configured as a single device or may be configured as the mobile relay station 2, 2a as in the above embodiments.

Note that, in the above embodiments, a case where the mobile body on which the mobile relay station is mounted is the LEO satellite has been described. However, the mobile body may be another flying object flying in the sky, such as a geostationary satellite, a drone, or a HAPS.

Some or all of the processing (beamforming control processing, time schedule creation processing) performed by the mobile relay station 2, 2a in the above-described embodiments may be implemented by a computer. In that case, a program for implementing these functions may be recorded in a computer-readable recording medium, and the program recorded in the recording medium may be read and executed by a computer system to implement the functions. Note that the "computer system" mentioned herein includes an OS and hardware such as a peripheral device. Also, the "computer-readable recording medium" refers to a portable medium such as a flexible disk, a magneto-optical disk, a ROM, or a CD-ROM, or a storage device such as a hard disk included in the computer system.

Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. In addition, the above program may be for implementing some of the functions described above, may be one that can implement the functions described above in combination with a program already recorded in the computer system, or may be one implemented by using a programmable logic device such as a field programmable gate array (FPGA).

Although embodiments of this invention have been described above in detail with reference to the Figures, specific configurations are not limited to these embodiments, and designs and so forth of a scope not departing from the essence of this invention are also included.

INDUSTRIAL APPLICABILITY

The present invention can be applied to technology of performing communication with a moving body in which a mobile relay station is installed.

REFERENCE SIGNS LIST 1, 1a Wireless communication system
2, 2a Mobile relay station
3 Terminal station
4 Base station
5 Reference station
21-1 to 21-N Antenna
22 Terminal communication unit
23 Control unit
24 Base station communication unit
25 Antenna
31 Data storage unit
32 Transmission/reception unit
33 Communication control unit
34 Antenna
41 Antenna
42 Transmission/reception unit
43 Base station signal reception processing unit
44 Terminal signal reception processing unit
51 Data storage unit
52 Transmission/reception unit
53 Communication control unit
54 Antenna
221-1 to 221-N Transmission/reception unit
222-1 to 222-N Terminal signal demodulation unit
231 Communication control unit
232 Channel estimation unit
233 Matrix generation unit
234 Antenna control unit
235 Time schedule creation unit
241 Storage unit
242 Control unit
243 Transmission data modulation unit
244 Transmission/reception unit
25 Antenna
26 Reference station information storage unit
441 Terminal signal demodulation unit
442 Terminal signal decoding unit

The invention claimed is:

1. A transceiver in a wireless communication system including one or more first communication apparatuses serving as reference at a time of forming a communication area, a second communication apparatus located near the one or more first communication apparatuses, and the transceiver that moves, the transceiver comprising:
a plurality of antennas that performs communication with the one or more first communication apparatuses and the second communication apparatus located near the one or more first communication apparatuses;
a channel estimator configured to perform channel estimation for each of the one or more first communication apparatuses based on a known reference signal transmitted from the one or more first communication apparatuses; and
an antenna controller configured to control the plurality of antennas using estimation value obtained by the channel estimation to form a beam having directivity in a direction in which the one or more first communication apparatuses are located,
wherein
according to the control of the antenna controllor, the plurality of antennas forms a transmission beam in a communication area formed in a predetermined range including the one or more first communication apparatuses or forms a reception beam for receiving a signal transmitted from the second communication apparatus located in the communication area,
further comprising:
a time schedule creator configured to create a schedule indicating a timing of forming a beam having directivity in a direction in which each of the first communication apparatuses is located, and wherein the time schedule creator creates the schedule on a basis of a movement route of the transceiver.

2. The transceiver according to claim 1, wherein when there is a plurality of the first communication apparatuses,
  the antenna controller forms a beam having directivity in a direction in which one of the first communication apparatuses is located using some antennas of the plurality of antennas, and forms a beam having directivity in a direction in which another one of the first communication apparatuses is located using remaining antennas of the plurality of antennas.

3. The transceiver according to claim 1, wherein the antenna controllor selects the one or more first communication apparatuses for which a beam is formed according to a movement route of the transceiver and position information of the one or more first communication apparatuses.

4. The transceiver according to claim 1, wherein the antenna controllor controls some antennas of the plurality of antennas to form a null beam for a specific first communication apparatus among the one or more first communication apparatuses.

5. A wireless communication system including one or more first communication apparatuses serving as reference at a time of forming a communication area, a second communication apparatus located near the one or more first communication apparatuses, and a transceiver that moves, wherein
  the one or more first communication apparatuses transmit a reference signal including at least identification information to the transceiver at a communicable timing with the transceiver,
  the transceiver includes
  a plurality of antennas that performs communication with the one or more first communication apparatuses serving as the reference at a time of forming the communication area and the second communication apparatus located near the one or more first communication apparatuses,
  a channel estimator configured to perform channel estimation for each of the one or more first communication apparatuses based on the reference signal transmitted from the one or more first communication apparatuses, and
  an antenna controllor configured to control the plurality of antennas using an estimation value obtained by the channel estimation to form a beam having directivity in a direction in which the one or more first communication apparatuses are located, and
  according to the control of the antenna controllor, the plurality of antennas forms a transmission beam in a communication area formed in a predetermined range including the one or more first communication apparatuses or forms a reception beam for receiving a signal transmitted from the second communication apparatus located in the communication area,
  wherein the transceiver further comprises:
  a time schedule creator configured to create a schedule indicating a timing of forming a beam having directivity in a direction in which each of the one of more first communication apparatuses is located, and wherein the time schedule creator creates the schedule on a basis of a movement route of the transceiver.

6. A wireless communication method in a wireless communication system including one or more first communication apparatuses serving as reference at a time of forming a communication area, a second communication apparatus located near the one or more first communication apparatuses, and a transceiver that moves, the method comprising:
  performing channel estimation for each of the one or more first communication apparatuses based on a known reference signal transmitted from one or more communication devices serving as reference at a time of forming a communication area;
  controlling a plurality of antennas using an estimation value obtained by the channel estimation to form a beam having directivity in a direction in which the one or more first communication apparatuses are located; and
  forming a transmission beam in a communication area formed in a predetermined range including the one or more first communication apparatuses, or forming a reception beam for receiving a signal transmitted from the second communication apparatus located in the communication area,
  creating a schedule indicating a timing of forming a beam having directivity in a direction in which each of the one or more first communication apparatuses is located, and
  creating the schedule on a basis of a movement route of the transceiver.

* * * * *